US011967988B2

(12) United States Patent
Espinoza-Garcia et al.

(10) Patent No.: US 11,967,988 B2
(45) Date of Patent: Apr. 23, 2024

(54) INSULATION DEVICE INCORPORATED IN AN OPTICAL WIRELESS COMMUNICATION EQUIPMENT

(71) Applicant: OLEDCOMM, Vélizy-Villacoublay (FR)

(72) Inventors: Alejandro Espinoza-Garcia, Plaisir (FR); Clément Lartigue, Clamart (FR); Carlos Dominguez-Gonzalez, Sèvres (FR)

(73) Assignee: OLEDCOMM

( * ) Notice: Subject to any disclaimer, the term of this patent is extended or adjusted under 35 U.S.C. 154(b) by 0 days.

(21) Appl. No.: 18/007,373

(22) PCT Filed: Jul. 27, 2021

(86) PCT No.: PCT/FR2021/051402
§ 371 (c)(1),
(2) Date: Jan. 30, 2023

(87) PCT Pub. No.: WO2022/023665
PCT Pub. Date: Feb. 3, 2022

(65) Prior Publication Data
US 2023/0275659 A1    Aug. 31, 2023

(30) Foreign Application Priority Data

Jul. 30, 2020   (FR) ........................... 2008138

(51) Int. Cl.
*H04B 10/116*   (2013.01)
(52) U.S. Cl.
CPC .................. *H04B 10/116* (2013.01)

(58) Field of Classification Search
CPC ..... H04B 10/11; H04B 10/114; H04B 10/116; H04B 10/503; H04B 10/502;
(Continued)

(56) References Cited

U.S. PATENT DOCUMENTS 4,888,216 A * 12/1989 Sannohe ................... C09C 1/62
                                                        427/221
6,433,481 B1 * 8/2002 Marutsuka ........... H05K 9/0096
                                                        313/493
(Continued)

OTHER PUBLICATIONS

International Search Report as issued in International Patent Application No. PCT/FR2021/051402, dated Nov. 12, 2021.

*Primary Examiner* — John R Lee
(74) *Attorney, Agent, or Firm* — Pillsbury Winthrop Shaw Pittman LLP

(57) ABSTRACT

An insulation device arranged to be fixed on an electrical board of an optical wireless communication equipment, and including an enclosure having a height at least equal to a height of an optical assembly including an optical concentrator, the enclosure including in its thickness an opaque material, the insulation device including at least one housing, the insulation device being arranged such that, when the insulation device and the optical assembly are mounted on the electrical board, the enclosure surrounds the receiving surface so as to insulate the optical assembly from unwanted optical signals, and the optical concentrator is positioned in the housing so that the housing assists in holding the optical concentrator in position in the optical wireless communication equipment.

14 Claims, 5 Drawing Sheets

(58) Field of Classification Search
CPC .. H04B 10/501; H04B 10/50; H04B 10/1149; H04B 10/1143; H04B 10/1141; H01L 33/56; H01L 33/54; H01L 33/52; H01L 25/11; H01L 25/167; H01L 31/167; H01L 31/16; H01L 31/12; H01L 2924/18301; H01L 2924/182; H01L 2924/1815; H01L 2924/1811; H01L 2924/181; H01L 2924/301; H01L 2924/3025
See application file for complete search history.

(56) References Cited

U.S. PATENT DOCUMENTS

| | | | |
|---|---|---|---|
| 6,751,420 B1 | 6/2004 | Kienzle et al. | |
| 8,576,574 B2 * | 11/2013 | Wong | H01L 23/552 361/764 |
| 9,641,997 B2 * | 5/2017 | Vratskides | H04W 48/16 |
| 9,820,373 B2 * | 11/2017 | Pennathur | H01L 23/4334 |
| 9,824,979 B2 * | 11/2017 | Dimayuga | H01L 24/43 |
| 9,900,988 B1 * | 2/2018 | Chao | H05K 3/284 |
| 9,949,359 B2 * | 4/2018 | Chen | H05K 1/18 |
| 10,389,445 B2 * | 8/2019 | Hong | H04B 10/60 |
| 10,709,041 B2 * | 7/2020 | Hansen | H05F 3/02 |
| 10,924,942 B2 * | 2/2021 | Henry | H04W 16/28 |
| 10,957,977 B2 * | 3/2021 | Henry | H01Q 1/38 |
| 11,266,010 B2 * | 3/2022 | Chen | H05K 3/284 |
| 2002/0195916 A1 * | 12/2002 | Marutsuka | H05K 9/0096 313/112 |
| 2007/0230965 A1 | 10/2007 | Horio et al. | |
| 2012/0320558 A1 * | 12/2012 | Foster | H01L 23/552 29/841 |
| 2014/0071634 A1 * | 3/2014 | Pakula | H01M 50/284 429/185 |
| 2015/0271911 A1 * | 9/2015 | Chen | H05K 9/0081 29/841 |
| 2015/0382175 A1 * | 12/2015 | Vratskides | H04W 8/06 455/435.1 |
| 2017/0186698 A1 * | 6/2017 | Dimayuga | H01L 24/85 |
| 2017/0227660 A1 * | 8/2017 | Zhang | H04W 12/50 |
| 2020/0153095 A1 * | 5/2020 | Henry | H01Q 25/007 |
| 2021/0227729 A1 * | 7/2021 | Liu | B32B 17/10036 |
| 2023/0275659 A1 * | 8/2023 | Espinoza-Garcia | H04B 10/11 250/215 |

* cited by examiner

[Fig. 1]
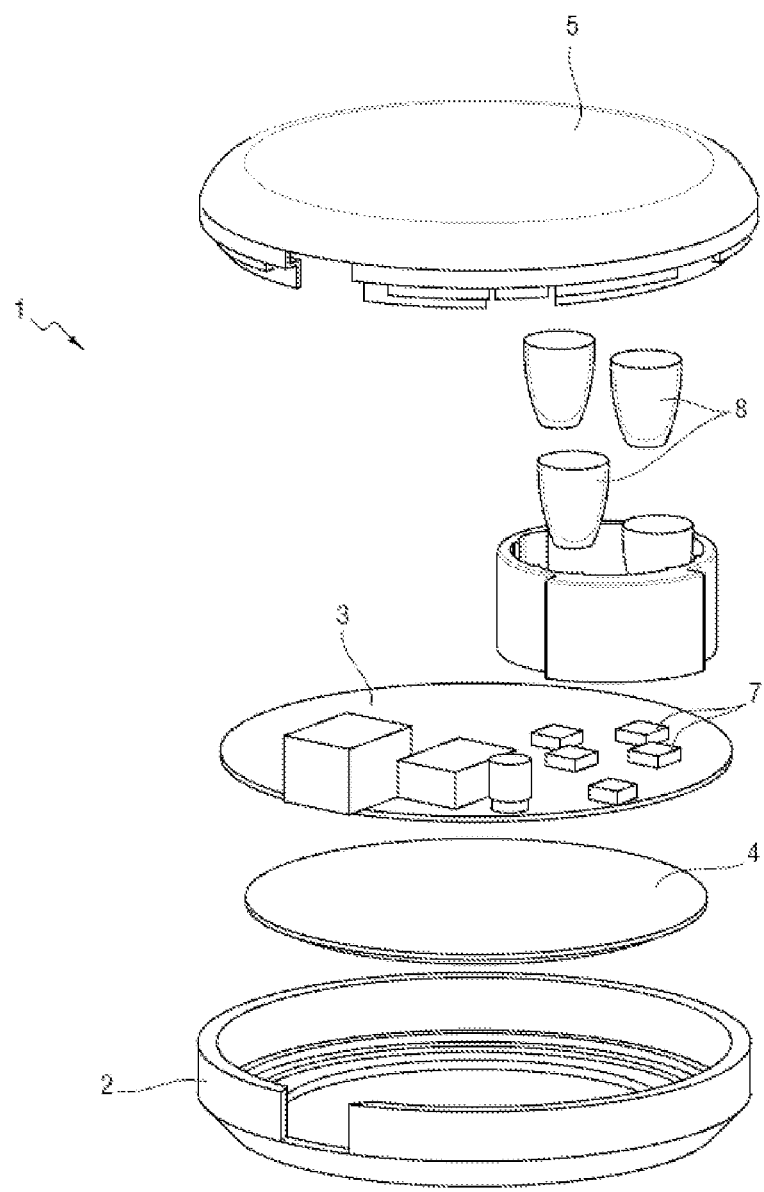

[Fig. 2]
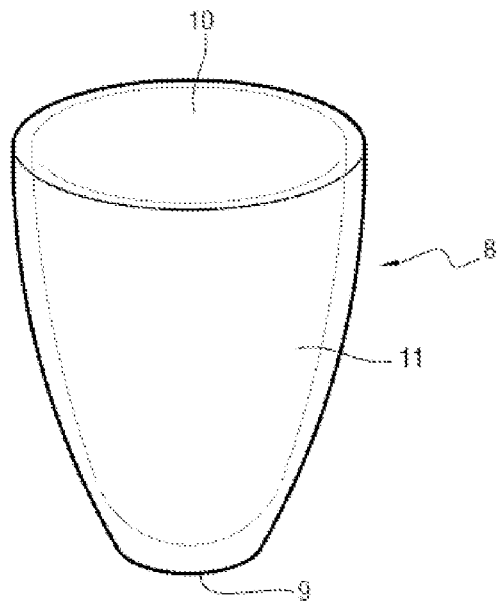
[Fig. 3]
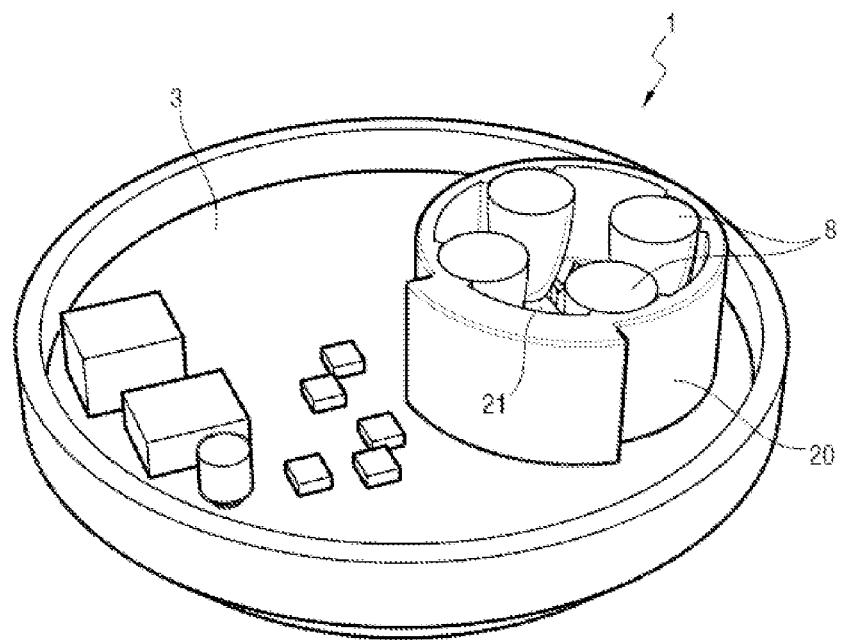

[Fig. 4]
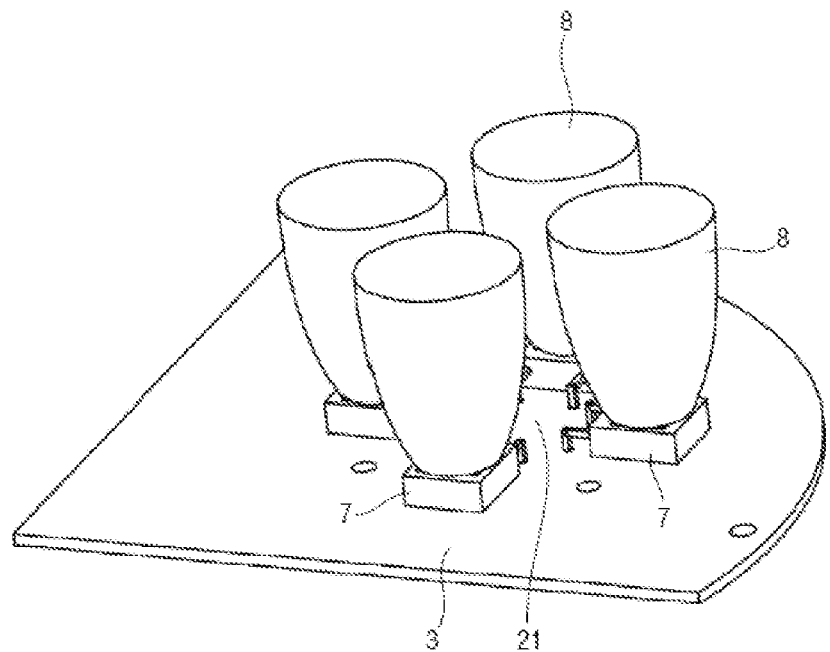
[Fig. 5]
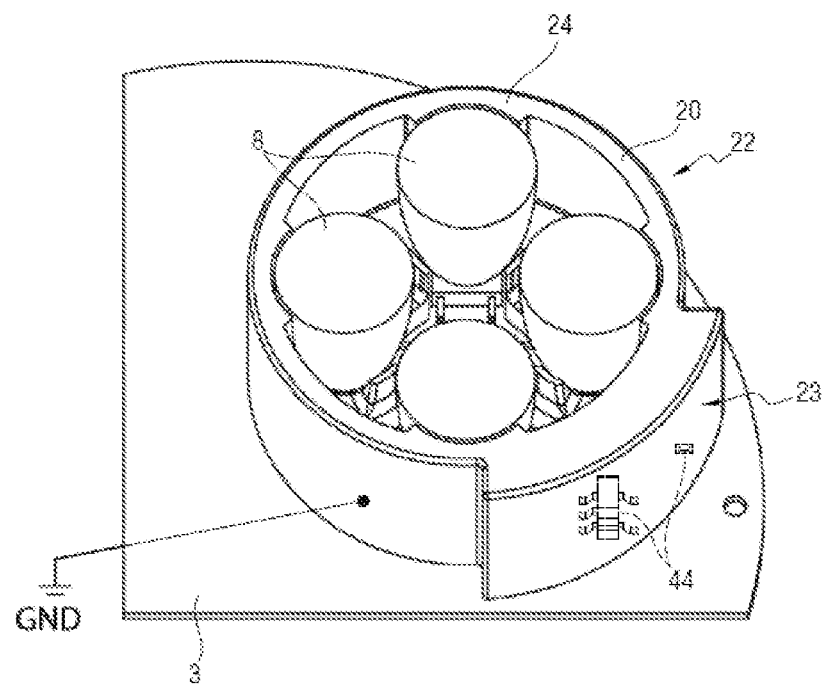

[Fig. 6]
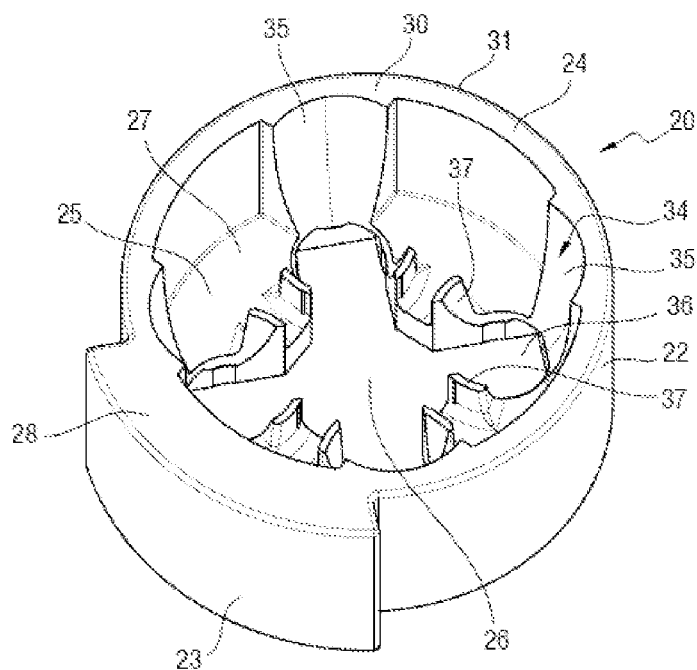
[Fig. 7]
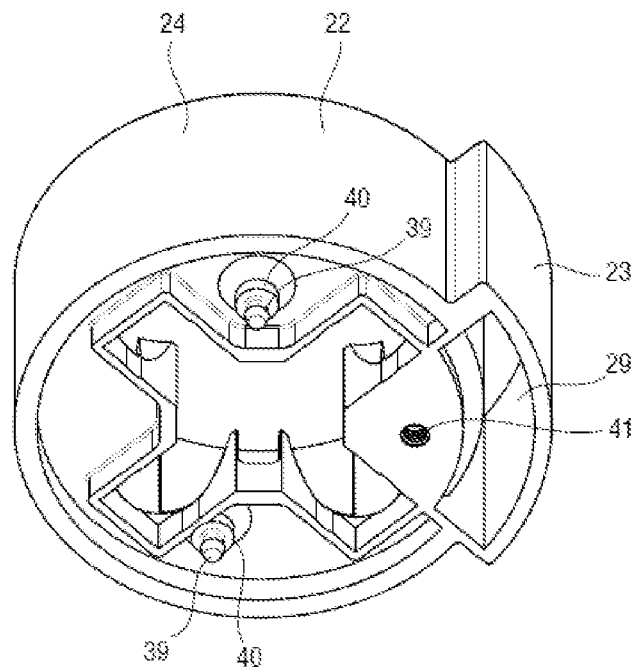

[Fig. 8]
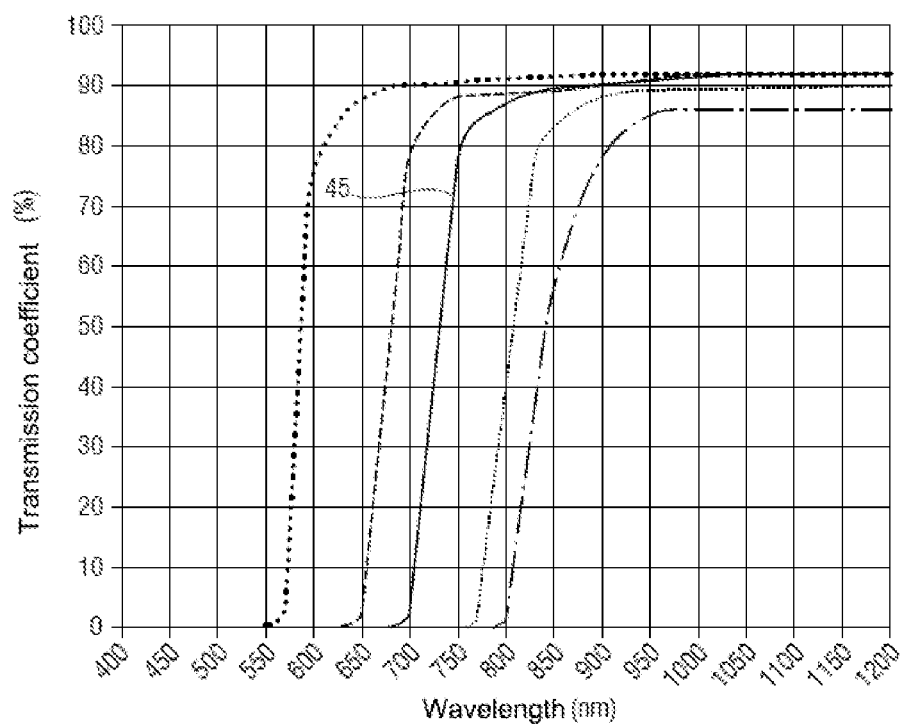

INSULATION DEVICE INCORPORATED IN AN OPTICAL WIRELESS COMMUNICATION EQUIPMENT

CROSS-REFERENCE TO RELATED APPLICATIONS

This application is the U.S. National Stage of PCT/FR2021/051402, filed Jul. 27, 2021, which in turn claims priority to French patent application number 2008138 filed Jul. 30, 2020. The content of these applications are incorporated herein by reference in their entireties.

BACKGROUND OF THE INVENTION

An Optical Wireless Communication (OWC) system, such as a Light Fidelity (LiFi) communication system, usually comprises two main pieces of equipment:
an access point;
a user terminal.
The access point plays a similar role as that of a WiFi gateway.
The user terminal is for example a computer, a smartphone or a tablet. Compatibility of the terminal can be ensured by means of a dongle which is connected, for example, to a USB port on the terminal.
In LiFi, a user can access a network (e.g., the Internet) via his/her terminal as long as the terminal is connected to a nearby access point. Once this connection has been established, the access point can transmit data down from the network to the terminal and therefore to the user, while the terminal can send data up to the network via the access point.
The quality of this bidirectional communication (throughput, latency, coverage, etc.) depends largely on the quality of the optical signals received, both by the terminal and by the access point. This signal quality is generally assessed by the signal-to-noise ratio (SNR), which is the ratio between the received signal power and the received noise power. The higher the received signal power and the lower the noise, the higher the SNR, and thus the higher the communication quality. Optimizing the SNR is therefore critical for improving the performance of an optical wireless communication system, such as a LiFi system.

Subject of the Invention

The purpose of the invention is to improve the signal-to-noise ratio and the robustness of an optical wireless communication equipment.

SUMMARY OF THE INVENTION

With a view to achieving this aim, an insulation device is proposed which is arranged to be fixed on an electrical board of an optical wireless communication equipment, the electrical board comprising a receiving surface on which is mounted at least one optical assembly comprising an optical concentrator coupled to a photodetector, the insulation device comprising an enclosure having a height at least equal to a height of the optical assembly, the enclosure comprising in its thickness an opaque material, the insulation device comprising at least one housing or holder located inside the enclosure and having a shape complementary to a shape of the optical concentrator,
the insulation device being arranged such that, when the insulation device and the optical assembly are mounted on the electrical board, the enclosure surrounds the receiving surface so as to insulate the optical assembly from unwanted optical signals, and the optical concentrator is positioned in the housing or holder such that the housing or holder assists in holding the optical concentrator in position in the optical wireless communication equipment.

The insulation device according to the invention therefore fulfils (at least) two functions.

The insulation device makes it possible to protect the photodetector and the optical concentrator from unwanted optical signals: natural light, room lighting, optical signals from a source in the optical wireless communication equipment, etc. This improves the SNR of the optical wireless communication equipment.

The insulation device also helps to hold the optical concentrator in position, and thus improves the robustness of the optical wireless communication equipment.

It is further proposed an insulation device as previously described, wherein the housing or holder comprises a side cavity formed in an inner side wall of the enclosure and having a shape complementary to a shape of a side surface of the optical concentrator.

It is further proposed an insulation device as previously described, wherein the housing or holder comprises a lower cavity formed in a bottom of the insulation device and having a shape complementary to a shape of a lower surface of the optical concentrator.

It is further proposed an insulation device as previously described, wherein the lower cavity is defined between two tabs which extend vertically from the bottom of the insulation device.

It is further proposed an insulation device as previously described, wherein the enclosure comprises within its thickness one or more materials forming an electromagnetic shield so that the insulation device insulates the optical assembly from electromagnetic disturbances that may be produced by electrical components located outside the enclosure.

It is further proposed an insulation device as previously described, wherein the material(s) forming the electromagnetic shield comprise a paint layer comprising copper.

It is further proposed an insulation device as previously described, wherein the material(s) forming the electromagnetic shield comprise metallic microparticles or nanoparticles embedded in the enclosure.

It is further proposed an insulation device as previously described, comprising a plurality of housings or holders evenly distributed along an inner circumference or periphery of the enclosure.

Furthermore, an optical wireless communication equipment is proposed, comprising the above-described insulation device and the electrical board.

Furthermore, an optical wireless communication equipment as previously described is proposed, comprising a housing or casing wherein the electrical board and the insulation device are integrated, as well as a cover arranged to close both the housing or casing and an inner volume delimited by the electrical board and the enclosure of the insulation device.

Furthermore, an optical wireless communication equipment as previously described is provided, wherein the cover is an optical filter arranged to filter wavelengths so as to improve the reception of optical signals by the wireless optical communication equipment.

Furthermore, an optical wireless communication equipment as described above is proposed, the optical wireless communication equipment being an access point.

Furthermore, an optical wireless communication equipment as described above is proposed, the wireless optical communication equipment being a user terminal.

The invention will be better understood with the aid of the following description of a particular non-limiting embodiment of the invention.

BRIEF DESCRIPTION OF THE DRAWINGS

Reference is made to the appended drawings, of which:

FIG. 1 is an exploded view of an access point wherein the invention is implemented;

FIG. 2 is a perspective view of an optical concentrator;

FIG. 3 is a top view of the access point without the cover;

FIG. 4 is a perspective view of a portion of the electrical board on which the photodiodes and optical concentrators are mounted;

FIG. 5 is a top perspective view of the insulation device and the optical concentrators;

FIG. 6 is a top perspective view of the insulation device;

FIG. 7 is a bottom perspective view of the insulation device;

FIG. 8 is a graph showing transmission coefficient versus wavelength curves.

DETAILED DESCRIPTION OF THE INVENTION

The invention is implemented in an optical wireless communication equipment belonging to an optical wireless communication system.

With reference to FIG. 1, the equipment here is an access point 1. The optical wireless communication is for example a LiFi communication.

The access point 1 comprises a casing 2 inside which an electrical board 3 is integrated and rests on a support 4 positioned at the bottom of the casing 2. A cover 5 is used to close the casing 2.

The electrical board 3 comprises a number of electrical and optoelectronic components.

Some of these components enable the implementation of an optical signal receiving device. The received optical signals are transmitted by a user's terminal and carry upstream data.

Some of these components allow the implementation of an optical signal transmission device. The transmitted optical signals are received by the user's terminal and carry downstream data.

The receiving device comprises a plurality of photodetectors, which are here photodiodes 7. The photodetectors could be of different types, and comprise for example one or more phototransistors (PT), one or more photoresistors (PR), one or more PIN photodiodes, one or more avalanche photodiodes, one or more SPADs (for Single Photon Avalanche Diode), one or more CMOS (for Complementary Metal Oxide Semiconductor) sensors, etc.

Each photodiode 7 is associated with an optical concentrator 8 which is positioned on the photodiode 7.

The optical concentrator 8 is here a compound parabolic concentrator (CPC) which has an external parabolic generator defined to collect light on the photodiode. Here, the word "compound" refers to the fact that the concentrator performs several optical functions implemented in parallel.

With reference to FIG. 2, the optical concentrator 8 thus has a coupling surface 9, a collecting surface 10 for collecting the light rays, and a side surface 11 located between the collecting surface 10 and the coupling surface 9.

The coupling surface 9 is intended to be positioned on a sensitive surface of the photodiode 7, which has a rectangular shape here (but could have a different shape, for example square or circular).

The purpose of the optical concentrator 8 is to focus all the light rays incident on the collecting surface 10 until a certain angle, which is the acceptance angle, towards the coupling surface 9 so that these light rays are captured by the photodiode 7.

Advantageously, an anti-reflection varnish or a thin layer is applied to the side surface of the optical concentrator 8, at the end of its manufacture, in order to improve the performance of capture and internal total reflections of the optical concentrator 8.

The access point 1 comprises here four optical assemblies, each comprising an optical concentrator 8 coupled to a photodiode 7.

In each optical assembly, the coupling surface 9 of the optical concentrator 8 is positioned on the sensitive surface of the photodiode 7. The coupling surface 9 of the optical concentrator 8 is glued to the sensitive surface of the photodiode 7. The glue used here is a polymer glue.

The polymer glue fulfils two functions. It allows the optical concentrator 8 to be attached to the photodiode 7. In addition, its physical and chemical properties are such that it absorbs very little of the light rays with a wavelength close to 940 nm, which makes it possible to optimize the power of the optical signals effectively collected by the photodiode 7.

When assembling the access point 1, the glue is first applied to the sensitive surfaces of the photodiodes 7 and then the optical concentrators 8 are placed on the sensitive surfaces. The glue is then exposed to ultraviolet radiation using an ultraviolet lamp. The glue polymerizes under the action of ultraviolet radiation and hardens to bond the coupling surface 9 of each optical concentrator 8 to the sensitive surface of a photodiode 7.

With reference to FIGS. 3 to 7, the access point 1 further comprises an insulation device 20 which is mounted on the electrical board 3 so as to surround the receiving surface 21 of the electrical board 3 on which the four optical assemblies are mounted, each comprising an optical concentrator 8 coupled to a photodiode 7.

The insulation device 20 comprises a main part 22 and a secondary part 23.

The main part 22 comprises an enclosure 24 and a bottom face 25. The enclosure 24 is generally in the form of a first ring. The bottom face 25 partially closes the first ring at its lower end. The bottom face 25 comprises a central opening 26 in the form of a cross comprising four arms of equal length formed in two directions perpendicular to each other. An inner surface of the bottom face 25 forms a bottom 27 of the insulation device 20.

The secondary part 23 forms an overhang of the main part 22, which extends from a minor angular portion of the main part 22 outwards. The secondary part 23 has the shape of an angular portion of a second ring coaxial to the first ring but of greater radius. The secondary part 23 is hollow. The secondary part 23 is closed at its upper side 28 and is open at its lower side 29.

The height of the enclosure 24 of the main part 22 is at least equal to the height of an optical assembly, i.e., the sum of the height of the photodiode 7 and the height of the optical concentrator 8 forming the optical assembly. Here, the height of the enclosure 24 is equal to the height of each optical assembly.

The enclosure 24 of the main part 22 comprises an inner body 30 and an outer layer 31 which are successively defined in the thickness of the enclosure 24.

The inner body 30 of the enclosure 24, as well as the bottom face 25 of the main part 22, comprise an opaque material, which in this case is a plastic allowing the insulation device 20 to be manufactured via an additive manufacturing method.

The outer layer 31 comprises an electromagnetic shielding material or materials.

In this case, these materials include a paint layer comprising copper, which is applied to the inner body 30. The outer layer 31 is connected to an electrical ground GND of the electrical board 3.

Advantageously, these materials also comprise metallic microparticles or nanoparticles, magnetic or non-magnetic, embedded in the inner body 30 of the enclosure 24. These particles form a powder with ultrafine grains, similar to laser printer toner powder. The particles may be embedded and oriented during the injection molding of the insulation device 20, when the latter is manufactured using this method. The insulation device 20 comprises four housings or holders 34 located inside the enclosure 24. By "inside the enclosure" is meant that the housings or holders are defined in an inner space bounded by the enclosure.

Each housing or holder 34 is positioned above one of the arms of the cross referred to earlier. The housings or holders 34 are thus evenly distributed along an inner circumference of the enclosure 24.

Each housing or holder 34 has a shape complementary to the shape of the optical concentrator 8.

Each housing or holder 34 comprises a side cavity 35 formed in an inner side wall of the enclosure 24. The side cavity 35 extends along the height of the enclosure 24 and has a shape complementary to the shape of the side surface 11 of the optical concentrator 8.

The housing or holder 34 further comprises a lower cavity 36 formed in the bottom 27 of the insulation device 20. The lower cavity 36 has a shape complementary to the shape of the lower surface of the optical concentrator 8. The lower cavity 36 is defined between two tabs 37 which extend vertically from the bottom 27 of the insulation device 20. Each tab 37 extends on either side of the arm of the cross above which the housing or holder 34 is positioned.

With reference to FIG. 7, it can be seen that the insulation device 20 comprises two fixing pins 39 which each extend vertically from the outer surface of the bottom face 25 of the main part 22 of the insulation device 20. The two fixing pins 39 are each positioned in an opposite quadrant of the outer surface of the bottom face 25.

A groove 40 is formed in each fixing pin 39, so that the diameter of the fixing pin 39 at mid-height is smaller than its diameter at its free end and at its base.

A threaded hole 41 through the bottom face 25 is provided in a third quadrant of the bottom face 25.

In order to attach the insulation device 20 to the circuit board 3, the bottom face 25 is first placed on one side of the circuit board 3.

Each fixing pin 39 is clicked and locked into a hole provided for this purpose in the electrical board 3.

The insulation device 20 is then screwed to the electrical board 3. A screw, which extends through the electrical board 3 into a hole provided for this purpose, is screwed into the threaded hole 41 of the insulation device 20.

It can be seen in FIG. 5 that the secondary part 23 of the insulation device 20, which is hollow, covers electrical components 44 located on the electrical board 3 outside the receiving surface 21. The insulation device 20 is therefore integrated into the access point 1 without the layout of the components on the electrical board 3 being adapted to its presence. The secondary part 23 therefore makes it possible to improve the integration of the insulation device 20 while maintaining the thickness and height of the enclosure 24.

When the insulation device 20 and the four optical assemblies are mounted on the electrical board 3, the enclosure 24 surrounds the receiving surface 21 of the electrical board 3 on which the four optical assemblies are positioned.

Each optical concentrator 8 is positioned in one of the housings or holders 34. The side surface 11 of said optical concentrator 8 is positioned in the side cavity 35 of said housing or holder 34, and the bottom surface of said optical concentrator 8 is positioned in the lower cavity 36 of said housing or holder 34.

The insulation device 20 fulfills three distinct functions: a mechanical holding function, an optical insulation function and an electromagnetic insulation function.

Each optical concentrator 8 is positioned in a housing or holder 34 in the insulation device 20, so that said housing or holder 34 helps to hold the optical concentrator 8 in position in the access point 1. The optical concentrators 8 cannot move laterally, so that the glue is not mechanically stressed. The attachment of the optical concentrators 8 to the photodiodes 7 remains robust over time.

The enclosure 24, thanks to the opaque material integrated in its thickness, isolates the four optical assemblies from unwanted optical signals. The cover 5 also contributes to this optical insulation: when the cover 5 closes the casing 2 of the access point 1, the cover 5 also closes the inner volume delimited by the electrical board 3 and the enclosure 24 of the insulation device 20.

The unwanted optical signals comprise the light rays emitted by the light source(s) of the access point 1. The light sources here are LEDs used to emit optical signals to a user terminal. The light sources are located on the electrical board 3 outside the enclosure 24.

Without the insulation device 20, the optical concentrators 8 could pick up light rays from these light sources and redirect them to the photodiodes 7, which would introduce an interference phenomenon also known as crosstalk, and thus a degradation in the quality of the communication.

Unwanted optical signals also include natural light, room lighting, etc.

It is noted that the housings or holders 34 also improve the internal total reflection capabilities of the optical concentrators 8.

The enclosure 24, thanks to the materials forming the electromagnetic shielding, i.e., here thanks to the paint layer comprising copper and to the metallic nanoparticles integrated in the inner body 30 of the enclosure 24, also makes it possible to insulate the four optical assemblies from electromagnetic disturbances that may be produced by electrical components of the access point 1 located outside the enclosure 24 (and by devices located in the vicinity of the access point 1). The electromagnetic shielding limits the penetration of electromagnetic radiation at the receiving surface 21 of the electrical board 3 on which the photodiodes 7 and optical concentrators 8 are mounted. Metallic particles embedded in the inner body 30 of the enclosure 24 further reduce the interference noise.

The photoelectric current produced by the photodiodes 7, which is proportional to the power of the light signal received, is indeed usually very weak and therefore easily disturbed by various surrounding sources of noise. Thus, electromagnetic radiation, if not blocked, can degrade this photoelectric current, and thus degrade the signal-to-noise ratio and thus the communication performance.

The cover 5, in turn, fulfills three functions.

It has been shown earlier that the cover 5 contributes, with the insulation device 20, to optically insulate the optical assemblies.

By closing the casing 2, the cover 5 also protects the interior of the access point 1 from external aggression: shocks, dust, etc.

Finally, cover 5 acts as an optical filter, in this case infrared, to optimize communication performance. The cover 5 only allows wavelengths of 700 nm and above to pass. The curve 45 of the transmission coefficient of cover 5 can be seen in FIG. 8. Thanks to the cover 5, light rays outside this wavelength band are absorbed (i.e., a large part of natural light, artificial lighting, etc.) and are not received as noise by the photodiodes 7.

Of course, the invention is not limited to the described embodiment but encompasses any variant falling within the scope of the invention as defined by the claims.

The invention has been implemented here in an access point. However, the insulation device can of course be integrated into any type of equipment that implements optical wireless communication, and for example into a user terminal.

The optical concentrator used is not necessarily a CPC but could be any type of concentrator: hollow concentrator (possibly assembled with a lens), dielectric and monobloc concentrator, compound elliptical concentrator, coupled concentrator comprising a first concentrator integrated into a second concentrator, Lens-walled type concentrator, etc.

The invention claimed is:

1. An insulation device arranged to be fixed on an electrical board of an optical wireless communication equipment, the electrical board comprising a receiving surface on which is mounted at least one optical assembly comprising an optical concentrator coupled to a photodetector, the insulation device comprising an enclosure having a height at least equal to a height of the optical assembly, the enclosure comprising in its thickness an opaque material, the insulation device comprising at least one holder located inside the enclosure and having a shape complementary to a shape of the optical concentrator, the insulation device being arranged such that, when the insulation device and the optical assembly are mounted on the electrical board, the enclosure surrounds the receiving surface so as to insulate the optical assembly from unwanted optical signals, and the optical concentrator is positioned in the holder such that the holder assists in holding the optical concentrator in position in the optical wireless communication equipment.

2. The insulation device according to claim 1, wherein the holder comprises a side cavity formed in an inner side wall of the enclosure and having a shape complementary to a shape of a side surface of the optical concentrator.

3. The insulation device according to claim 1, wherein the holder comprises a lower cavity formed in a bottom of the insulation device and having a shape complementary to a shape of a lower surface of the optical concentrator.

4. The insulation device according to claim 3, wherein the lower cavity is defined between two tabs which extend vertically from the bottom of the insulation device.

5. The insulation device according to claim 1, wherein the enclosure comprises within its thickness one or more materials forming an electromagnetic shield so that the insulation device insulates the optical assembly from electromagnetic disturbances that may be produced by electrical components located outside the enclosure.

6. The insulation device according to claim 5, wherein the one or more materials forming the electromagnetic shield comprise a paint layer comprising copper.

7. The insulation device according to claim 5, wherein the one or more materials forming the electromagnetic shield comprise metallic microparticles or nanoparticles embedded in the enclosure.

8. The insulation device according to claim 1, comprising a plurality of holders located inside the enclosure and evenly distributed around an inner periphery of the enclosure.

9. An optical wireless communication equipment, comprising the insulation device according to claim 1 and the electrical board.

10. The optical wireless communication equipment according to claim 9, comprising a housing, wherein the electrical board and the insulation device are integrated, as well as a cover arranged to close both the housing and an inner volume delimited by the electrical board and the enclosure of the insulation device.

11. The optical wireless communication equipment according to claim 10, wherein the cover is an optical filter arranged to filter wavelengths so as to improve reception of optical signals by the optical wireless communication equipment.

12. The optical wireless communication equipment according to claim 9, the optical wireless communication equipment being an access point.

13. The optical wireless communication equipment according to claim 9, the optical wireless communication equipment being a user terminal.

14. An optical module for an optical wireless communication equipment, to be mounted on an electrical board of said optical wireless communication equipment, comprising:

at least one optical assembly comprising an optical concentrator coupled to a photodetector, to be mounted on a receiving surface of the electrical board;

an insulation device arranged to be fixed on the electrical board, comprising an enclosure having a height at least equal to a height of the optical assembly, the enclosure comprising in its thickness an opaque material, the insulation device comprising at least one holder located inside the enclosure, wherein each optical concentrator has a collecting surface for collecting light rays, a coupling surface for coupling with the photodetector of its optical assembly, and a side surface located between the collecting surface and the coupling surface;

wherein the insulation device is arranged such that, when the optical module is mounted on the electrical board, the enclosure surrounds the receiving surface so as to insulate the optical assembly from unwanted optical signals, and the optical concentrator is positioned in the holder such that the holder assists in holding the optical concentrator in position in the optical wireless communication equipment; and wherein:

the side surface of each optical concentrator is specifically shaped to focus all light rays incident on the collecting surface, until a certain angle which is called the acceptance angle, towards the coupling surface so that these light rays are captured by the photodetector, and each holder comprises a side cavity formed in an inner side wall of the enclosure and having a shape complementary to the specific shape of the side surface of the optical concentrator that it receives such that the latter cannot move laterally.

\* \* \* \* \*